United States Patent Office 3,576,641
Patented Apr. 27, 1971

3,576,641
SENSITIZING DYES
Kaiichiro Sakazume, Shigemasa Itoh, and Shui Sato, Tokyo, and Eiichi Sakamoto, Hanno-shi, Japan, assignors to Konishiroku Photo Industry Co., Ltd.
Filed Dec. 10, 1968, Ser. No. 782,523
Claims priority, application Japan, Dec. 20, 1967, 42/81,158
Int. Cl. G03c 1/10
U.S. Cl. 96—130                         5 Claims

ABSTRACT OF THE DISCLOSURE

Silver halide photographic emulsions containing a sensitizing cyanine dye having a 2-(2-hydroxy-3-sulfopropoxy)ethyl group.

---

This invention relates to a new sensitizing dye. More particularly, this invention relates to light-sensitive silver halide photographic emulsion which contains a spectral sensitizing cyanine dye having a 2-(2-hydroxy-3-sulfopropoxy)ethyl group of the general formula

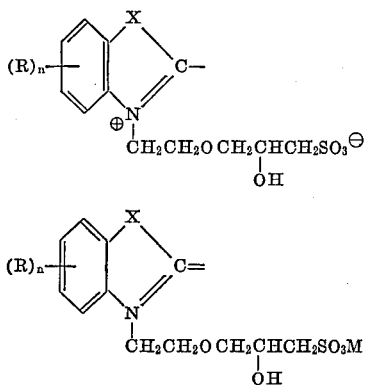

wherein R represents hydrogen, a lower alkyl group or a halogen atom, $n$ is 1 or 2, X represents sulfur, oxygen or a gorup =N—$R_1$ ($R_1$ represents an alkyl group) and M represents hydrogen, an alkali metal, ammonium group a residue of an organic base.

The sensitizing dye having a nucleus of the above general formula incorporated into a silver halide photographic emulsion can display high sensitizing effect and gives no undesirable color stain on a film after developing treatment as compared with prior sensitizing dyes. Moreover, the sensitizing dyes according to this invention have high solubility in an organic solvent such as methanol or ethanol and therefore the preparation of a solution of such dye is very easy. The sensitizing dyes according to this invention when used in a color photographic emulsion are readily compatible with a color coupler and show the characteristic features as a practical spectral sensitizer free from fogging and improved in sensitivity.

Synthesis of sensitizing dyes according to this invention are shown by way of the following synthesis examples which do not intend to limit the present invention. Synthesis of sensitizing dye (1)

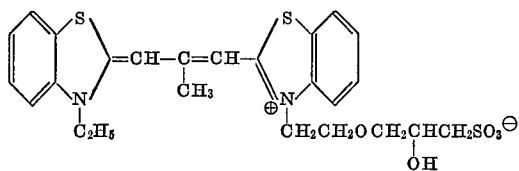

According to the disclosure of a Journal of the Chemical Society of Japan, Industrial Chemistry Section, (1960) 63, 595, sodium 3-halogenoethoxy-2-hydroxypropanesulfonate is prepared pursueing the following reaction scheme $$XCH_2CH_2OCH_2CH\underset{O}{\overset{}{\diagdown\diagup}}CH_2 + NaHSO_3 \longrightarrow$$

$$SCH_2CH_2OCH_2CHCH_2SO_3Na \longrightarrow$$
$$\qquad\qquad\qquad\ \, |$$
$$\qquad\qquad\qquad OH$$

$$XCH_2CH_2OCH_2CHCH_2SO_3H$$
$$\qquad\qquad\qquad\ \ |$$
$$\qquad\qquad\qquad OH$$

The above sodium salt is purified by passing gaseous hydrogen chloride through a suspension of the sodium salt in an alcohol or by passing an aqueous solution of the sodium salt through an ion exchange resin column to afford 3-halogenoethoxy - 2 - hydroxypropanesulfonic acid as syrup.

In an oil bath, 7.4 g. of 2-methylbenzothiazole are reacted with 3.2 g. of 3-chloroethoxy-2-hydroxypropanesulfonic acid obtained as above at 200°–210° C. for 45 minutes. The reaction mixture is then cooled and 2-methylbenzothiazole hydrochloride adhered on the flask is eliminated. The reaction mixture is washed with actone and ether and added with 3.7 g. of 3-ethyl-2-thioacetylbenzothiazole ethyliodide, 15 ml. of alcohol, 10 g. of phenol and 3 ml. of triethylamine. The resulting mixture is then reacted for 1.5 hours on a water bath and concentrated. The reaction product is crystallized with other, cooled and filtered. Recrystallization of the resulting crude dye from methanol and chloroform gives 0.58 g. of prism crystal melting at 273°–275° C. and having the absorption maximum at 549 m$\mu$ (in methanol).

SYNTHESIS OF SENSITIZING DYE (2)

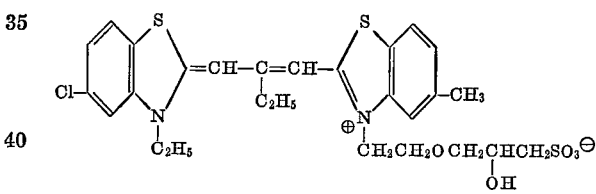

The process for the synthesis of the dye (1) is repeated with the following compounds:

2,5-dimethylbenzothiazole—3.26 g.
3-chloroethoxy-2-hydroxypropanesulfonic acid—2.18 g.
3-ethyl-2-thiopropyl-5 - chlorobenzothiazole ethyliodide—2.5 g.
Alcohol—40 ml.
Phenol—10 g.
Triethylamine—4 ml.

0.5 g. of the resulting crude dye is recrystalllized twice from methanol to give 0.2 g. of the above dye (2) as violet crystal with red shade melting at 208°–210° C. and having the absorption maximum at 554 m$\mu$ (in methanol).

SYNTHESIS OF SENSITIZING DYE (3)

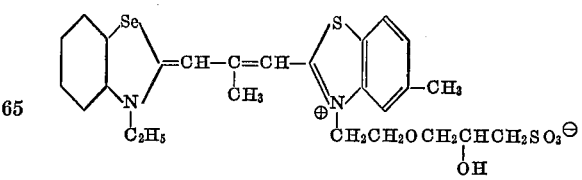

The process for the synthesis of the dye (1) is repeated with the following compounds:

2,5-dimethylbenzothiazole—3.2 g.

washed with methanol-acetone. After decrystallization from methanol, 0.5 g. of the dye (9) is obtained as violet crystal melting at 244°–247° C. and having the absorption maximum at 553 mμ (in methanol).

The sensitizing dyes according to this invention are preferably added to the silver halide photographic emulsion in an amount of 1–100 mg. per kilogram of the emulsion. Addition in a more or less amount does not cause any deleterious result. As solvent, an organic solvent ordinarily used such as methanol or ethanol may be used.

Addition of a sensitizing dye may be carried out at any stage in the production of the silver halide photographic emulsion. Preferably it is added immediately after the second ripening. The emulsion incorporated with such sensitizing dye may have been sensitized by the noble metal-, sulfur-, reduction- or polyalkyleneoxide-sensitization or by super sensitization in a manner known per se. The emulsion may further be incorporated with an anionic wetting agent (surfactant). The photographic emulsion sensitized by the sensitizing dyes according to this invention is coated on a support such as cellulose acetate or polyester film or baryta paper in a usual manner and dried to give a light-sensitive silver halide photographic material.

The new sensitizing dyes according to this invention may be added to multi-layer colorphotographic emulsion as well as to black and white photographic emulsion. The sensitizing dyes according to this invention do not react with a color coupler contained in the emulsion but bring about desired high spectral sensitivity without causing any undesirable effect on the photographic properties.

Further, a film made from the silver halide photographic emulsion incorporated with a sensitizing dye according to the present invention is free from color staining after developing and fixing treatments and therefore, a high speed silver halide emulsion suffered from less color staining than the prior emulsion is obtainable by the present invention.

The present invention is illustrated by way of the following examples.

Example 1

A high speed silver bromoiodide emulsion containing 3 mol percent of silver iodide is prepared according to the neutral method. Immediately after the second ripening, 1 kg. of the emulsion is added with 50 ml. of 0.1% methanolic solution of each sensitizing dye indicated below in a table. The emulsion thus treated is coated on a film base and dried. As a control, the same emulsion added with the following dye is coated on a film base and dried in a similar manner as above.

Control dye:

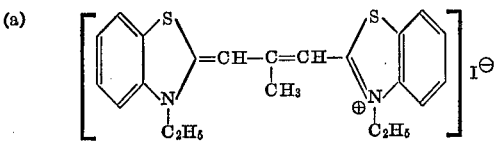

(a)

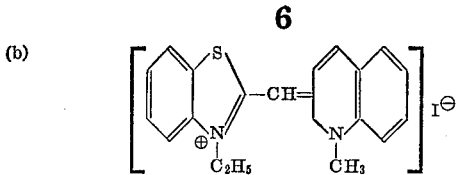

(b)

Each of the light-sensitive photographic material thus obtained is then exposed to light according to a JIS method (K7609) and treated with a developer having the following formulation at 20° C. for 5 minutes.

| | G. |
|---|---|
| Monomethyl p-aminophenol sulfate | 3 |
| Sodium sulfate (anhydrous) | 50 |
| Hydroquinone | 6 |
| Sodium carbonate (monohydrate) | 30 |
| Potassium bromide | 1 |
| Water to make up 2 liters. | |

Spectral sensitivity is determined by employing a diffraction lattice type spectrophotometer (with a light source of 2840° K.). The photographic properties and residual color density thus determined are set forth in a Table 1, wherein photographic speed of film is expressed as a relative value to the light-sensitive speed of the control film to white light, green light, yellow light or red light, each of which is rated as 100, and wherein the residual color density is expressed as a density measured by means of a color densitometer.

TABLE 1

| Additive | Amount 0.9% methanolic solution (ml.)/kg. emulsion | Fog | Relative speed | | | Sensitivity, max. (mμ) | Residual color, density |
|---|---|---|---|---|---|---|---|
| | | | White light | Green light | Red light | | |
| Control dye (a) | 50 | 0.04 | 100 | 100 | 100 | 630 | 0.10 |
| Dye (1) | 50 | 0.03 | 105 | 110 | 108 | 630 | 0.05 |
| Dye (6) | 50 | 0.04 | 102 | 105 | 115 | 640 | 0.06 |
| Control dye (b) | 50 | 0.04 | 100 | 100 | ------ | 540 | 0.07 |
| Dye (4) | 50 | 0.04 | 100 | 115 | ------ | 540 | 0.04 |

The appended FIG. 1 shows the spectral sensitivity curve of the silver bromoiodide emulsion itself used in this example and FIG. 2 shows the spectral sensitivity curve of the silver bromoiodide emulsion incorporated with the sensitizing dye (6). As evident from the above table and drawings, the light-sensitive photographic material prepared from the emulsion according to this invention is free from fogging and improved in spectral sensitivity and residual color density after the development, in comparison with the prior photographic material.

EXAMPLE 2

A low speed light-sensitive silver chlorobromide positive emulsion is added with 30 ml. of 0.1% methanolic solution of the sensitizing dye (7) per kilogram of said emulsion. The emulsion thus treated is coated on a film base and dried. The resulting light-sensitive silver halide photographic material is compared with that incorporated with the following control dye and treated under the same condition as above.

Control dye (c):

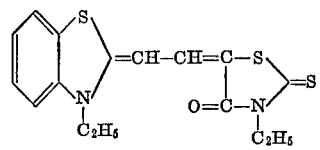

The results of sensitometric measurement of such photographic materials treated in the similar manner as in the Example 1 are set forth in a Table 2, wherein photographic speed of film is expressed as a relative value to the light-sensitive speed of the control film to white light, green light or yellow light, each of which is rated as 100.

TABLE 2

| Additive | Amount 0.1% methanolic solution (ml)/kg. emulsion | Fog | Relative speed | | | Sensitivity, max. (mµ) | Residual color density |
|---|---|---|---|---|---|---|---|
| | | | White light | Green light | Yellow light | | |
| Control dye (c) | 30 | 0.04 | 100 | 100 | 100 | 560 | 0.10 |
| Sensitizing dye (7) | 30 | 0.04 | 105 | 115 | 108 | 560 | 0.05 |

The appended FIG. 3 shows the spectral sensitivity curve of the silver chlorobromide positive emulsion itself used in this example and FIG. 4 shows the spectral sensitivity curve of said emulsion incorporated with the sensitizing dye (7). As evident from the above table and drawings, the light-sensitive photographic material prepared from the emulsion according to this invention is free from fogging and markedly improved in sensitivity and residual color desnity after the development, as compared with the prior photographic material.

EXAMPLE 3

A high speed silver bromoiodide emulsion as used in the Example 1 is added with 60 ml. of 0.1% methanolic solution of the sensitizing dye (2) per kilogram of solid emulsion. In addition, 1-octadecyl-2-(1-hydroxynaphthyl)benzimidazolo-5-sulfonic acid as a color coupler is dispersed in said emulsion according to a usual manner and pH is adjusted to 6.8.

The resulting red-sensitive color photographic emulsion is coated on a film base either immediately after the preparation or after incubation for 3 hours at 40° C. After drying, each of the resulting films is exposed to light according to a JIS method (K 7609) and subjected to the ordinary color development, bleaching, fixing and water washing treatments. As a control, a film incorporated with the following control dye and treated under the same condition as above is used.

Control dye (d):

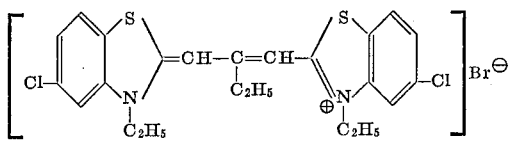

Results of sensitometric measurement of these films are set forth in a Table 3, wherein photographic speed of film is expressed as a relative value to the light-sensitive speed of the control film wherein the emulsion is coated immediately after the preparation of said emulsion to white light or red light, rated as 100.

As obviously shown in the Table 3, the light-sensitive photographic material incorporated with the sensitizing dye according to this invention is free from undesirable reaction between said sensitizing dye and the color coupler even under the severe condition and particularly improved in sensitivity and fogging.

The appended FIG. 5 shows the sepctral sensitivity curve of the emulsion incorporated with the sensitizing dye (2) as used in this example.

What is claimed is:

1. A silver halide photographic emulsion which comprises a spectral sensitizing cyanine dye having a nucleus of the general formula

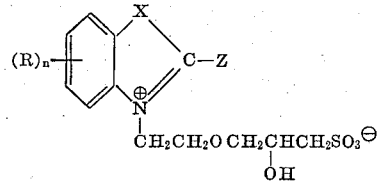

or

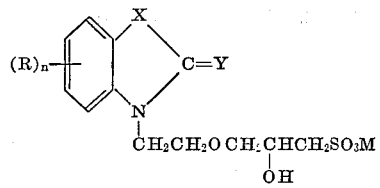

wherein R represents hydrogen, a lower alkyl group or a halogen atom, $n$ is 1 or 2, X represents sulfur or oxygen atom or a group $=N-R_1$ ($R_1$ represents an alkyl group), M represents hydrogen, an alkali metal, ammonium group or a residue of an organic base, Z represents

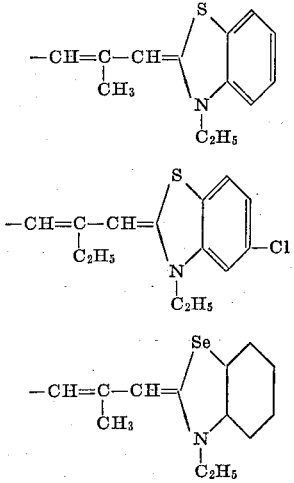

TABLE 3

| Additive | Amount 0.1% methanolic solution (ml.)/kg. emulsion | Immediately after the preparation of emulsion | | | Incubated at 40° C. for 3 hrs. after the preparation of emulsion | | | Sensitivity, max. (mµ) |
|---|---|---|---|---|---|---|---|---|
| | | Relative speed | | | Relative speed | | | |
| | | White light | Red light | Fog | White light | Red light | Fog | |
| Control dye (d) | 60 | 100 | 100 | 0.05 | 105 | 75 | 0.06 | 650 |
| Sensitizing dye (2) | 60 | 115 | 125 | 0.04 | 110 | 120 | 0.04 | 650 |

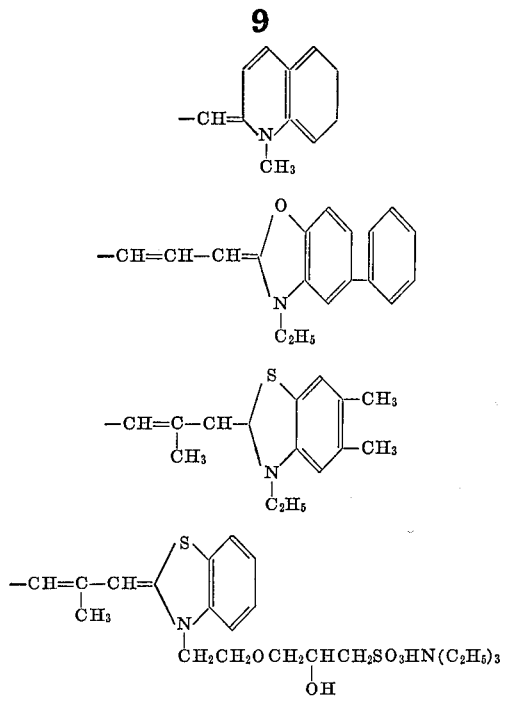

or

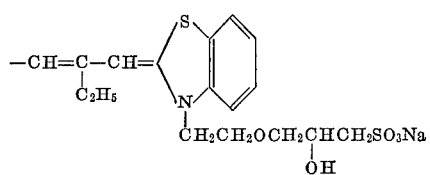

Y is

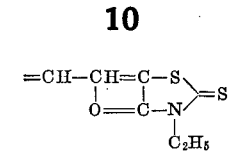

2. A light-sensitive silver halide photographic emulsion as claimed in claim 1, wherein said spectral sensitizing dye is anhydro-1'-methyl-3β-(2-hydroxy - 3 - sufopropoxy) ethylthia-2'-cyanine hydroxide.

3. A light-sensitive silver halide photographic emulsion as claimed in claim 1, wherein said spectral sensitizing dye is anhydro-3-ethyl-5-chloro - 5' - methyl-9-ethyl-3'-β-(2-hydroxy - 3 - sulfopropoxy)-ethylthia-carbocyanine hydroxide.

4. A light-sensitive silver halide photographic emulsion as claimed in claim 1, wherein said spectral sensitizing dye is anhydro - 3,3' - di[β-(2-hydroxy-3-sulfopropoxy) ethyl]-9-methylthia-carbocyanine hydroxide.

5. A light-sensitive silver halide photographic emulsion as claimed in claim 1, further comprising a color coupler.

References Cited

UNITED STATES PATENTS 3,352,857 11/1967 Brooker et al. _____ 96—106X
3,411,916 11/1968 Brooker et al. _____ 96—106

WILLIAM D. MARTIN, Primary Examiner

T. G. DAVIS, Assistant Examiner

U.S. Cl. X.R.

96—120

> # United States Patent Office

3,576,642
NPN-COMPOSITION FOR RUMINANT ANIMALS
Andrew Cochran Currie, Largs, and Norman Macdonald Morss and Ian Thomson, West Kilbride, Scotland, assignors to Imperial Chemical Industries Limited, London, England
No Drawing. Filed May 13, 1968, Ser. No. 728,826
Claims priority, application Great Britain, May 19, 1967, 23,472/67
Int. Cl. A23k 1/00
U.S. Cl. 99—2
3 Claims

ABSTRACT OF THE DISCLOSURE

Non-protein nitrogenous compositions having a greatly reduced rate of solution, are produced by adding sodium carboxymethyl cellulose. Increased amounts of these may be used more safely and efficiently in animal foodstuffs.

---

This invention relates to improved non-protein nitrogenous compositions for use in feeds for animals and to the preparation of such compositions and to animal feeds comprising said compositions.

It is well known that ruminant animals have the ability of using non-protein nitrogenous (hereinafter referred to as NPN) compounds in small amounts to replace part of their requirements for dietary protein. If too high a proportion of the protein of animal foodstuff is replaced by NPN material such as urea, the animal's health may be seriously impaired and in some cases the animal may die. This is because the NPN compounds dissolve so rapidly in the rumen fluids that they cannot be used efficiently for protein synthesis and are therefore absorbed in toxic quantities by the animal. The use of increased quantities of NPN compounds in ruminant animal feeds is facilitated by reducing the rate of solution of the NPN compound. It has been proposed to effect this by chemically altering the NPN compound but a more promising method involves coating the NPN compound in particulate form with a water-soluble polymeric material. The coating materials hitherto proposed have either been insufficiently effective in reducing the rate of solution of NPN compounds to a desirable extent or they have been too effective, giving NPN compounds which only released NPN compound in the rumen fluid at an undesirably slow rate at which it is also inefficiently used by the animal.

We have now discovered that if the NPN compound is admixed with a water-soluble salt of carboxymethyl cellulose its rate of solution can be substantially reduced and NPN compositions can be prepared which may be used in the feeds of animals to give efficient utilisation of the NPN material without harmful effect on the animal.

Thus in accordance with this invention a NPN composition for use in an animal foodstuff comprises a NPN compound in admixture with a water-soluble salt of carboxymethyl cellulose. The invention also includes a method of feeding an animal wherein the animal is fed with a NPN composition of the invention.

The NPN compound is preferably urea, but other NPN compounds which may advantageously be used include biuret and ammonium salts, such as ammonium sulphate or ammonium phosphate.

The water-soluble salt of carboxymethyl cellulose is advantageously sodium carboxymethyl celluose. Preferably the sodium carboxymethyl cellulose is a grade having a degree of substitution of 0.4 to 1.2 sodium carboxymethyl groups per anhydroglucose unit and such that a 1% aqueous solution at 20° C. has a viscosity of 2000 to 5000 centipoises (as measured by A.S.T.M. Method D1439–64T). The water-soluble salt of carboxymethyl cellulose may, if desired, be treated with or mixed with a substance, for example citric acid, to reduce its water solubility.

Conveniently, the NPN composition should comprise water-soluble salts of carboxymethyl cellulose and NPN compound in the weight ratio 2.5:97.5 to 15:85. Preferably the ratio is 5:95 to 10:90.

A final animal feed may safely contain up to 7% by weight of the NPN composition but a preferred amount is in the range 2 to 5% by weight. A high protein supplement for addition to basal cereal diets to give balanced rations might contain up to 5% of the NPN composition. The feed may contain any conventional foodstuff ingredient, for example carbohydrate materials such as grain or flavouring material. Food ingredients such as grain meal and spice may also be incorporated into the NPN compositions.

The NPN compositions of the invention may be prepared in particulate form wherein particles of NPN compound are coated with water-soluble salt of carboxymethyl cellulose but preferably it is mixed into animal feed in the form of aggregated granules or pellets.

The rate of NPN compound solution is dependent to a great extent on the size of the granules of the NPN composition. Granules or pellets having a minimum dimension of 2 to 10 millimetres have been found to give a desirable rate of NPN compound release.

The granules or pellets may, if desired, be coated with a waterproof polymeric material, for example polyvinyl chloride or copolymer thereof with polyvinyl acetate, to reduce taste or to delay dissolution for an initial period after the granules or pellets are immersed in rumen fluid.

In one process of preparation particles of NPN compound are intimately mixed with finely divided water-soluble salt of carboxymethyl cellulose and the dry mixture is pressed into aggregates by pelletting or rolling and subsequenty breaking the compressed mass.

In another process particles of NPN compound are coated with a solution of water-soluble salt of carboxymethyl cellulose. The coated particles may be dried and, if desired, subsequently aggregated by pressing or by means of a binding agent, but preferably the coated particles are aggregated into granules before drying, the water-soluble salt of cellulose ether being a sufficiently effective binding agent for this purpose.

In a further preferred process of preparation the NPN compound is intimately mixed with water-soluble salt of carboxymethyl cellulose and water to form a paste which may be shaped into any desired size by, for example, extruding through a die and cutting into lengths or rolling into a sheet and dividing the sheet, the water being dried off either before or after cutting or dividing the material. The amount of water in the paste is preferably 0.5 to 4.0 parts by weight to each part of water-soluble salt of carboxymethyl cellulose. In one advantageous form of this method the water is supplied as molasses which imparts a desirable colour and taste to the NPN composition.

In one specially advantageous method of preparation an aqueous solution of a NPN compound, for example urea, is used directly as produced in its preparation process without cooling or drying, the water-soluble salt of carboxymethyl cellulose being added to the hot solution to form the paste.

If it is desired to coat granules or pellets of the NPN composition with a waterproof polymeric material this may conveniently be effected by spraying a solution of the polymeric material over an agitated quantity of the granules or pellets and subsequently removing the solvent, for example by a stream of air.

The invention is further illustrated by the following examples wherein all parts and percentages are by weight.